United States Patent
Liu et al.

(10) Patent No.: US 9,094,131 B2
(45) Date of Patent: Jul. 28, 2015

(54) SIGNAL GENERATING METHOD AND APPARATUS

(71) Applicant: Huawei Technologies Co., Ltd., Shenzhen, Guangdong (CN)

(72) Inventors: Lei Liu, Chengdu (CN); Liangchuan Li, Shenzhen (CN); Bangning Mao, Munich (DE); Li Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 343 days.

(21) Appl. No.: 13/718,800

(22) Filed: Dec. 18, 2012

(65) Prior Publication Data
US 2013/0108277 A1    May 2, 2013

Related U.S. Application Data

(63) Continuation of application No. PCT/CN2011/073394, filed on Apr. 27, 2011.

(30) Foreign Application Priority Data

Jun. 18, 2010    (CN) .......................... 2010 1 0213306

(51) Int. Cl.
*H04B 10/556* (2013.01)
*H04B 10/54* (2013.01)
(Continued)

(52) U.S. Cl.
CPC ........ *H04B 10/5561* (2013.01); *H04B 10/5053* (2013.01); *H04B 10/541* (2013.01); *H04L 27/2096* (2013.01)

(58) Field of Classification Search
None
See application file for complete search history.

(56) References Cited

U.S. PATENT DOCUMENTS

| 3,752,992 A | 8/1973 | Fluhr |
| 6,421,155 B1 | 7/2002 | Yano |

(Continued)

FOREIGN PATENT DOCUMENTS

| CN | 101505192 A | 8/2009 |
| CN | 101626274 A | 1/2010 |
| CN | 101729187 A | 6/2010 |

OTHER PUBLICATIONS

Sakamoto, T.; Chiba, A.; Kawanishi, T., "50-km SMF transmission of 50-Gb/s 16 QAM generated by quad-parallel MZM," Optical Communication, 2008. ECOC 2008. 34th European Conference on , vol., no., pp. 1,2, Sep. 21-25, 2008.*

(Continued)

*Primary Examiner* — Ken Vanderpuye
*Assistant Examiner* — Merlin Brito Peguero
(74) *Attorney, Agent, or Firm* — Leydig, Voit & Mayer, Ltd.

(57) ABSTRACT

A signal generating method and apparatus in the field of signal technologies are provided. The method includes: adjusting an incident angle of an optical signal entering a polarization beam splitter, so that the polarization beam splitter outputs a first optical signal and a second optical signal that have a preset power ratio; performing QPSK modulation on the first and second optical signal respectively by using a first and second externally input data streams, to obtain a first and a second QPSK optical signal; before the first QPSK optical signal and the second QPSK optical signal are input into a polarization beam combiner, adjusting a polarization state of the first or the second QPSK optical signal; when the polarization states of the two QPSK optical signals are the same, outputting a 16QAM signal; and when the polarization states of the two QPSK optical signals are orthogonal, outputting a DP-QPSK signal.

12 Claims, 5 Drawing Sheets

(51) Int. Cl.
*H04L 27/20* (2006.01)
*H04B 10/50* (2013.01)

(56) References Cited

U.S. PATENT DOCUMENTS

| | | | | |
|---|---|---|---|---|
| 8,611,751 | B2 * | 12/2013 | Liu et al. | 398/98 |
| 2003/0206676 | A1 | 11/2003 | Ovadia et al. | |
| 2007/0166046 | A1 | 7/2007 | Hecker et al. | |
| 2009/0269080 | A1 | 10/2009 | Akiyam et al. | |
| 2010/0080569 | A1 | 4/2010 | Xu et al. | |
| 2010/0196016 | A1 * | 8/2010 | Zhang et al. | 398/152 |
| 2010/0329696 | A1 * | 12/2010 | Yu et al. | 398/188 |
| 2011/0150479 | A1 * | 6/2011 | Kim et al. | 398/65 |

OTHER PUBLICATIONS

Sakamoto, Takahide; Chiba, Akito; Kawanishi, Tetsuya, "50-Gb/s 16 QAM by a quad-parallel Mach-Zehnder modulator," Optical Communication—Post-Deadline Papers (published 2008), 2007 33rd European Conference and Exhibition of , vol., no., pp. 1,2, Sep. 16-20, 2007.*

G. Lu, T. Sakamoto, A. Chiba, T. Kawanishi, T. Miyazaki, K. Higuma, M. Sudo, and J. Ichikawa, "Monolithically Integrated Quad Mach-Zehnder IQ Modulator for Optical 16-QAM Generation," in Conference on Lasers and Electro-Optics 2010, OSA Technical Digest (CD) (Optical Society of America, 2010), paper CPDA7.*

"Implementation Agreement for Integrated Polarization Multiplexed Quadrature Modulated Transmitters," OIF Optical Internetworking Forum, IA # OIF-PMQ-TX-01.0, Mar. 12, 2010.*

Extended European Search Report in corresponding European Patent Application No. 11795047.7 (Jun. 19, 2013).

Pfau et al., "Coherent Digital Polarization Diversity Receiver for Real-Time Polarization-Multiplexed QPSK Transmission at 2.8 Gb/s," IEEE Photonics Technology Letters, Dec. 15, 2007, vol. 19, No. 24, Institute of Electrical and Electronics Engineers, United States of America.

Written Opinion of the International Searching Authority in corresponding PCT Patent Application No. PCT/CN2011/073394 (Dec. 18, 2012).

International Search Report in corresponding PCT Patent Application No. PCT/CN2011/073394 (Aug. 11, 2011).

Chinese Search Report in corresponding Chinese Patent Application No. 2010102133067 (Sep. 13, 2012).

* cited by examiner

SIGNAL GENERATING METHOD AND APPARATUS

CROSS-REFERENCE TO RELATED APPLICATIONS

This application is a continuation of International Patent Application No. PCT/CN2011/073394, filed on Apr. 27, 2011, which claims priority to Chinese Patent Application No. 201010213306.7, filed on Jun. 18, 2010, both of which are hereby incorporated by reference in their entireties.

FIELD OF THE INVENTION

The present invention relates to the field of signal technologies, and in particular, to a signal generating method and apparatus.

BACKGROUND OF THE INVENTION

In a communication system, important modulation modes include quadrature phase shift keying (Quadrature Phase Shift Keying, QPSK), 16 quadrature amplitude modulation (16 Quadrature Amplitude Modulation, 16QAM), and dual polarization quadrature phase shift keying (Dual Polarization Quadrature Phase Shift Keying, DP-QPSK). Accordingly, a QPSK signal may be obtained by adopting the QPSK modulation, a 16QAM signal may be obtained by adopting the 16QAM modulation, and a DP-QPSK signal may be obtained by adopting the DP-QPSK modulation.

Referring to FIG. 1, FIG. 1 is a schematic diagram of an existing modulation structure for generating a QPSK signal. As shown in FIG. 1, a QPSK modulator receives an externally input data stream (Data) and an optical signal that is input by a laser diode (LD), and performs QPSK modulation on the input optical signal by using the data stream, so as to obtain a QPSK signal and output the QPSK signal. The QPSK signal modulation structure show in FIG. 1 is capable of generating only a QPSK signal, but cannot generate other signals.

Referring to FIG. 2, FIG. 2 is an existing schematic diagram of a modulation structure for generating a 16QAM signal. As shown in FIG. 2, an optical signal output by an LD is split into a first optical signal and a second optical signal that have the same optical amplitude (that is, having the same optical power), and the second optical signal is processed by a variable optical attenuator (VOA), so that the optical amplitude of the second optical signal is attenuated to 25% (that is, the optical power is attenuated to 25%); a first QPSK modulator receives externally input Data and the first optical signal, and performs QPSK modulation on the first optical signal by using the externally input Data, so as to obtain a first QPSK signal; a second QPSK modulator receives externally input Data and the second optical signal that is processed by the VOA, and performs QPSK modulation on the second optical signal that is processed by the VOA by using the externally input Data, so as to obtain a second QPSK signal; and a 16QAM signal is obtained by combining the first QPSK signal and the second QPSK signal, and is then output. The 16QAM signal modulation structure shown in FIG. 2 is capable of generating only a 16QAM signal, but cannot generate other signals.

Referring to FIG. 3, FIG. 3 is a schematic diagram of an existing modulation structure for generating a DP-QPSK signal. As shown in FIG. 3, an optical signal of an LD is input into a polarization beam splitter (PBS) and then split into a first optical signal and a second optical signal that have different polarization directions; the polarization direction of the first optical signal is orthogonal to that of the second optical signal, and the optical power of the first optical signal is equal to that of the second optical signal; a first QPSK modulator receives externally input Data and the first optical signal, and performs QPSK modulation on the first optical signal by using the externally input Data, so as to obtain a first QPSK signal; a second QPSK modulator receives externally input Data and the second optical signal, and performs QPSK modulation on the second optical signal by using the externally input Data, so as to obtain a second QPSK signal; and a DP-QPSK signal is obtained by combining the first QPSK signal and the second QPSK signal through a polarization beam combiner (PBC), and is then output. The DP-QPSK signal modulation structure shown in FIG. 3 is capable of generating only a DP-QPSK signal, but cannot generate other signals.

The modulation structures for generating the QPSK, 16QAM, and DP-QPSK signals are capable of generating only a corresponding type of signals respectively, but cannot generate other types of signals.

SUMMARY OF THE INVENTION

To solve the technical problems in the prior art, embodiments of the present invention provide a signal generating method and apparatus, so as to generate different signals.

An embodiment of the present invention provides a signal generating apparatus, including:

a first adjustment module, a polarization beam splitter, a first quadrature phase shift keying modulator, a second quadrature phase shift keying modulator, a second adjustment module, and a polarization beam combiner, where the first adjustment module is configured to adjust an incident angle of an optical signal entering the polarization beam splitter, so that the polarization beam splitter outputs a first optical signal and a second optical signal that have a preset power ratio;

the first quadrature phase shift keying modulator is configured to modulate the first optical signal by using an externally input data stream, so as to obtain a first quadrature phase shift keying optical signal;

the second quadrature phase shift keying modulator is configured to modulate the second optical signal by using an externally input data stream, so as to obtain a second quadrature phase shift keying optical signal;

the second adjustment module is configured to adjust a polarization state of the first quadrature phase shift keying optical signal or a polarization state of the second quadrature phase shift keying optical signal, before the first quadrature phase shift keying optical signal and the second quadrature phase shift keying optical signal are input into the polarization beam combiner; and the polarization beam combiner is configured to output a 16 quadrature amplitude modulation signal when the polarization states of the two quadrature phase shift keying optical signals are the same, or configured to output a dual polarization quadrature phase shift keying signal when the polarization states of the two quadrature phase shift keying optical signals are orthogonal.

An embodiment of the present invention provides a signal generating method, including:

adjusting an incident angle of an optical signal entering into a polarization beam splitter, so that the polarization beam splitter outputs a first optical signal and a second optical signal that have a preset power ratio;

performing quadrature phase shift keying modulation on the first optical signal by using an externally input data stream, to obtain a first quadrature phase shift keying optical signal;

performing quadrature phase shift keying modulation on the second optical signal by using an externally input data stream, to obtain a second quadrature phase shift keying optical signal;

adjusting a polarization state of the first quadrature phase shift keying optical signal or a polarization state of the second quadrature phase shift keying optical signal, before the first quadrature phase shift keying optical signal and the second quadrature phase shift keying optical signal are input into a polarization beam combiner; and when the polarization states of the two quadrature phase shift keying optical signals are the same, outputting, by the polarization beam combiner, a 16 quadrature amplitude modulation signal; and when the polarization states of the two quadrature phase shift keying optical signals are orthogonal, outputting, by the polarization beam combiner, a dual polarization quadrature phase shift keying signal.

Compared with the prior art, the embodiments of the present invention have the following beneficial effects:

In the embodiments of the preset invention, two optical signals having a preset power ratio may be obtained by adjusting an incident angle of an optical signal entering a polarization beam splitter, and QPSK modulation is performed on the two optical signals by using an externally input data stream respectively to obtain two QPSK signals; according to an optical power ratio of the two QPSK signals, the two QPSK signals may be adjusted to have the same polarization state and then combined to obtain a 16QAM signal; or the two QPSK signals is adjusted to have orthogonal polarization states and then combined to obtain a DP-QPSK signal. In this manner, different signals can be generated.

BRIEF DESCRIPTION OF THE DRAWINGS

To illustrate technical solutions in the embodiments of the present invention or in the prior art more clearly, the accompanying drawings for describing the embodiments are introduced briefly in the following. Apparently, the embodiments in the following description are merely a part rather than all of the embodiments of the present invention. Persons of ordinary skill in the art may obtain other accompanying drawings based on the accompanying drawings without creative efforts.

DETAILED DESCRIPTION OF THE EMBODIMENTS

The technical solutions according to the embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
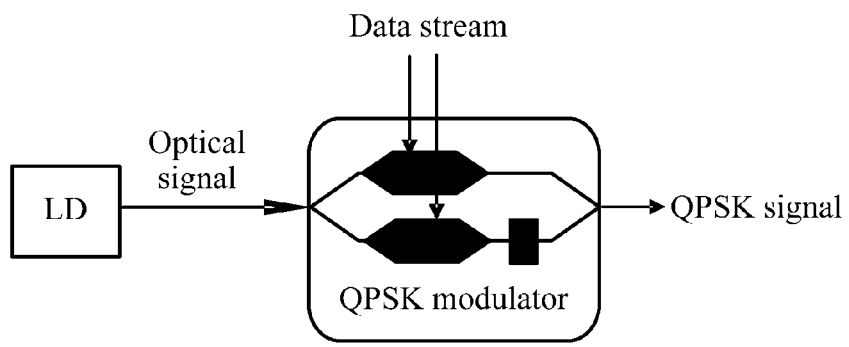
FIG. 1 is a schematic diagram of an existing modulation structure for generating a QPSK signal.
Figure 2:
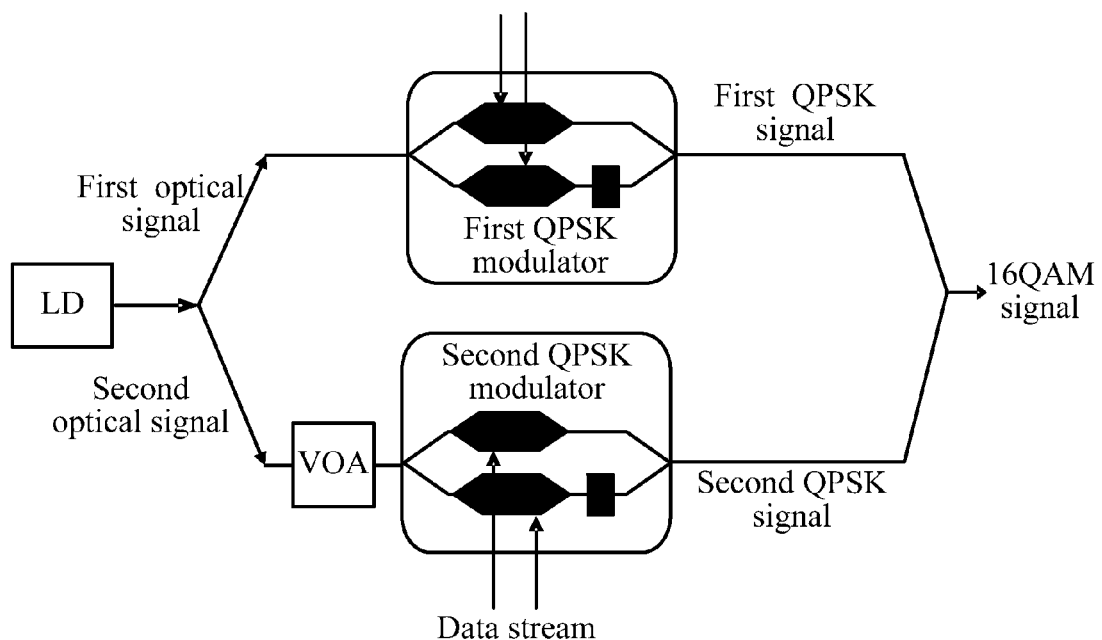
FIG. 2 is a schematic diagram of an existing modulation structure for generating a 16 QAM signal.
Figure 3:
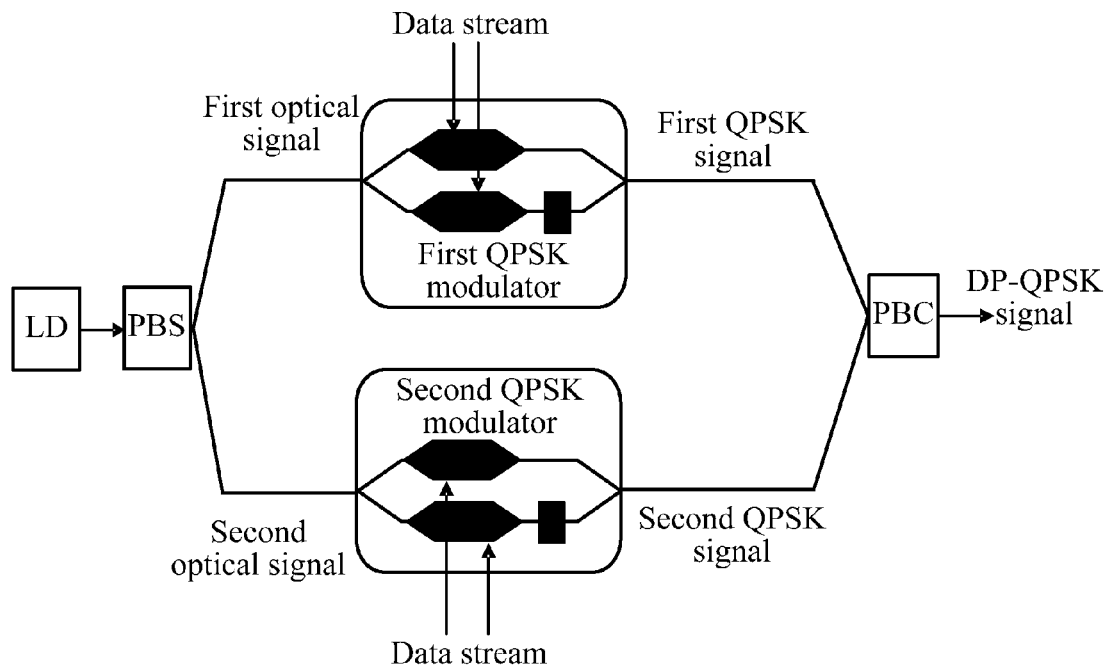
FIG. 3 is a schematic diagram of an existing modulation structure for generating a DP-QPSK signal.
Figure 4:
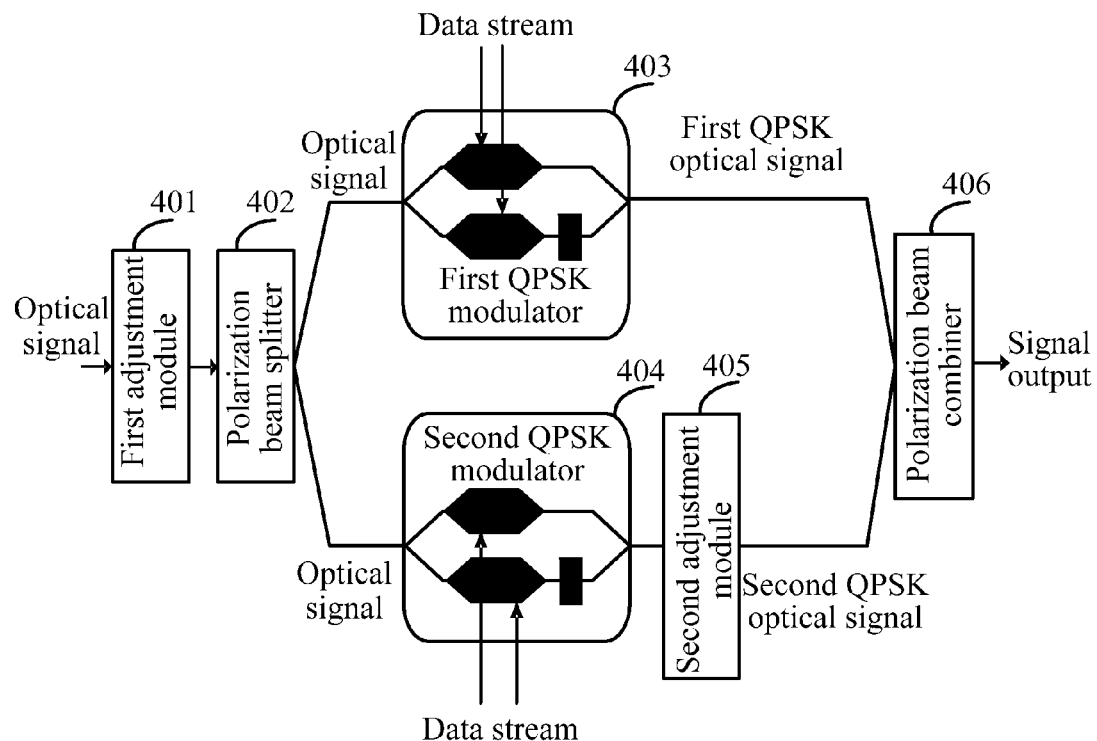
FIG. 4 is a structural diagram of a signal generating apparatus according to an embodiment of the present invention.

Referring to FIG. 4, FIG. 4 is a structural diagram of a signal generating apparatus according to an embodiment of the present invention. As shown in FIG. 4, the signal generating apparatus may include: a first adjustment module 401, a polarization beam splitter 402, a first QPSK modulator 403, a second QPSK modulator 404, a second adjustment module 405, and a polarization beam combiner 406.

The first adjustment module 401 is connected to the polarization beam splitter 402, and configured to adjust an incident angle of an optical signal entering the polarization beam splitter 402, so that the polarization beam splitter 402 outputs a first optical signal and a second optical signal that have a preset power ratio, where the optical signal may be provided by a laser diode (LD).

The first QPSK modulator 403 is connected to a first output end of the polarization beam splitter 402, and configured to modulate the first optical signal by using an externally input data stream, to obtain a first QPSK optical signal.

The second QPSK modulator 404 is connected to a second output end of the polarization beam splitter 402, and configured to modulate the second optical signal by using an externally input data stream, to obtain a second QPSK optical signal.

In this embodiment, the second adjustment module 405 is connected to the second QPSK modulator 404 and the polarization beam combiner 406, and configured to adjust a polarization state of the second QPSK optical signal before the first QPSK optical signal and the second QPSK optical signal are input into the polarization beam combiner 406, so that polarization states of the first QPSK optical signal and the second QPSK optical signal that are input into the polarization beam combiner 406 are orthogonal or the same.

Optionally, the second adjustment module 405, may also be connected to the first QPSK modulator 403 and the polarization beam combiner 406 (not shown in FIG. 4), and configured to adjust a polarization state of the first QPSK optical signal before the first QPSK optical signal and the second QPSK optical signal are input into the polarization beam combiner 406, so that the polarization states of the first QPSK optical signal and the second QPSK optical signal that are input into the polarization beam combiner 406 are orthogonal or the same, which is not limited in this embodiment.

As shown in FIG. 4, the polarization beam combiner 406 is connected to the first QPSK modulator 403 and the second QPSK modulator 404, and configured to output a 16QAM signal when the polarization states of the first and second QPSK optical signals are the same, or output a DP-QPSK signal when the polarization states of the first and second QPSK optical signals are orthogonal.

In this embodiment, the first adjustment module 401 may specifically adjust an incident angle of an LD optical signal emitted into the polarization beam splitter 402, so that a power ratio between the first optical signal and the second optical signal that are output by the polarization beam splitter 402 is 1:4 or 4:1.

Figure 5:
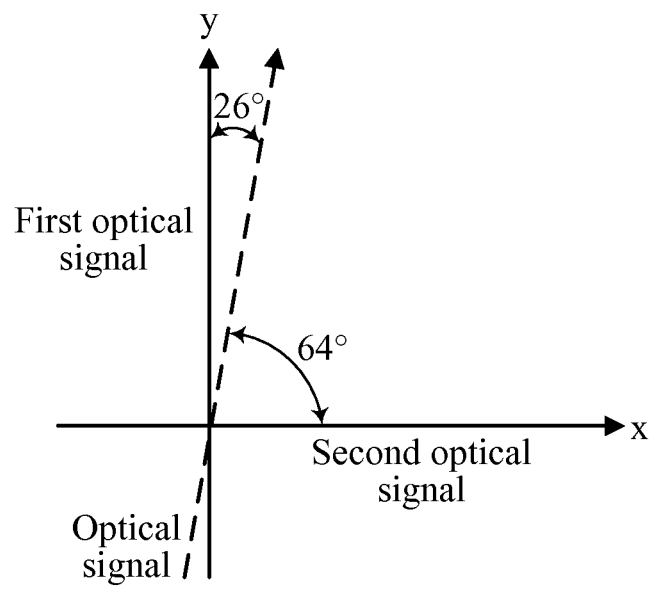
FIG. 5 is a schematic diagram of an optical signal emitted into a polarization beam splitter.

Referring to FIG. 5, FIG. 5 is a schematic diagram of an optical signal emitted into the polarization beam splitter 402.

The y-axis and x-axis represent directions of the first optical signal and the second optical signal that are output by the polarization beam splitter 402, respectively. A dashed line represents a direction of an optical signal that is adjusted by the first adjustment module 401 and enters the polarization beam splitter 402. As shown in FIG. 5, when an angle between the dashed line and the y-axis is 26°, an angle between the dashed line and the x-axis is 64°. In this case, the power ratio between the first optical signal output in the direction of the y-axis and the second optical signal output in the direction of the x-axis is 4:1. Alternatively, when the angle between the dashed line and the y-axis is 64°, the angle between the dashed line and the x-axis is 26° (not shown in FIG. 5). In this case, the power ratio between the first optical signal output in the direction of the y-axis and the second optical signal output in the direction of the x-axis is 1:4.

In a situation in which the power ratio between the first optical signal and the second optical signal is 1:4 or 4:1, the second adjustment module 405 may specifically adjust the polarization state of the second QPSK optical signal, so that the polarization states of the first QPSK optical signal and the second QPSK optical signal that are input into the polarization beam combiner 406 are the same, and the polarization beam combiner 406 may output a 16QAM signal. In this manner, the 16QAM signal output by the polarization beam combiner 406 is specifically a 16QAM signal with a square constellation.

Optionally, in the situation in which the power ratio between the first optical signal and the second optical signal is 1:4 or 4:1, if the second adjustment module 405 is connected to the first QPSK modulator 403 and the polarization beam combiner 406 (not shown in FIG. 4), the second adjustment module 405 may specifically adjust the polarization state of the first QPSK optical signal, so that the polarization states of the first QPSK optical signal and the second QPSK optical signal that are input into the polarization beam combiner 406 are the same, and the polarization beam combiner 406 may output a 16QAM signal.

In this embodiment of the present invention, the polarization beam combiner 406 may output 16QAM signals with various types of constellations, as long as the first adjustment module 401 is used to adjust an incident angle of an optical signal entering the polarization beam splitter 402 so that the polarization beam splitter 402 outputs the first optical signal and the second optical signal with various power ratios, and the second adjustment module 405 adjusts the polarization state of the first QPSK optical signal or the second QPSK optical signal so that the polarization states of the two QPSK optical signals that are input into the polarization beam combiner 406 are the same. The details are not described herein again.

In this embodiment, the first adjustment module 401 may specifically adjust the incident angle of the LD optical signal entering the polarization beam splitter 402, so that the power ratio between the first optical signal and the second optical signal that are output by the polarization beam splitter 402 is 1:1.

Figure 6:
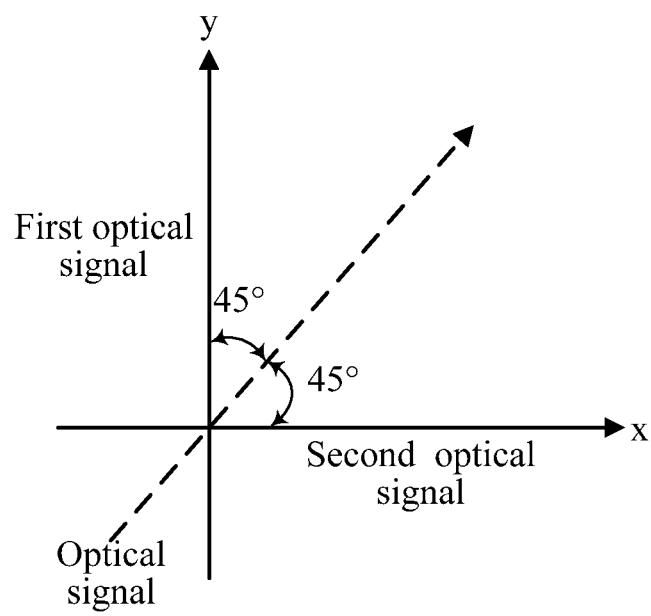
FIG. 6 is another schematic diagram of an optical signal emitted into a polarization beam splitter.

Referring to FIG. 6, FIG. 6 is another schematic diagram of an optical signal emitted into the polarization beam splitter 402. The y-axis and x-axis represent directions of the first optical signal and the second optical signal that are output by the polarization beam splitter 402, respectively. A dashed line represents a direction of an optical signal that is adjusted by the first adjustment module 401 and enters the polarization beam splitter 402. As shown in FIG. 6, when an angle between the dashed line and the y-axis is 45°, an angle between the dashed line and the x-axis is 45°. In this case, a power ratio between the first optical signal output in the direction of the y-axis and the second optical signal output in the direction of the x-axis is 1:1.

In a situation in which the power ratio between the first optical signal and the second optical signal is 1:1, the second adjustment module 405 may specifically adjust the polarization state of the second QPSK optical signal, so that the polarization states of the first and second QPSK optical signals that are input into the polarization beam combiner 406 are orthogonal, and the polarization beam combiner 406 may output a DP-QPSK signal.

Optionally, in the situation when the power ratio between the first optical signal and the second optical signal is 1:1, if the second adjustment module 405 is connected to the first QPSK modulator 403 and the polarization beam combiner 406 (not shown in FIG. 4), the second adjustment module 405 may specifically adjust the polarization state of the first QPSK optical signal, so that the polarization states of the first and second QPSK optical signals that are input into the polarization beam combiner 406 are orthogonal, and the polarization beam combiner 406 may output a DP-QPSK signal. It should be noted that, in the situation in which the power ratio between the first optical signal and the second optical signal is 1:1, if the polarization states of the first and second QPSK optical signals are adjusted to be orthogonal, values of optical power of the two polarization states of the obtained DP-QPSK signal are almost equal. Definitely, for some particular cases or application requirements, the power ratio between the first optical signal and the second optical signal may not be 1:1. In this case, by adjusting the polarization states of the first and second QPSK optical signals to be orthogonal, a DP-QPSK signal can still be obtained. However, a difference may exist in the values of the optical power of the two polarization states of the DP-QPSK signal, which is not limited in this embodiment.

Further, in the signal generating apparatus provided by this embodiment, the first adjustment module 401 may also be configured to adjust the incident angle of the optical signal emitted into the polarization beam splitter 402, so that the polarization beam splitter 402 outputs only one optical signal.

Figure 7:
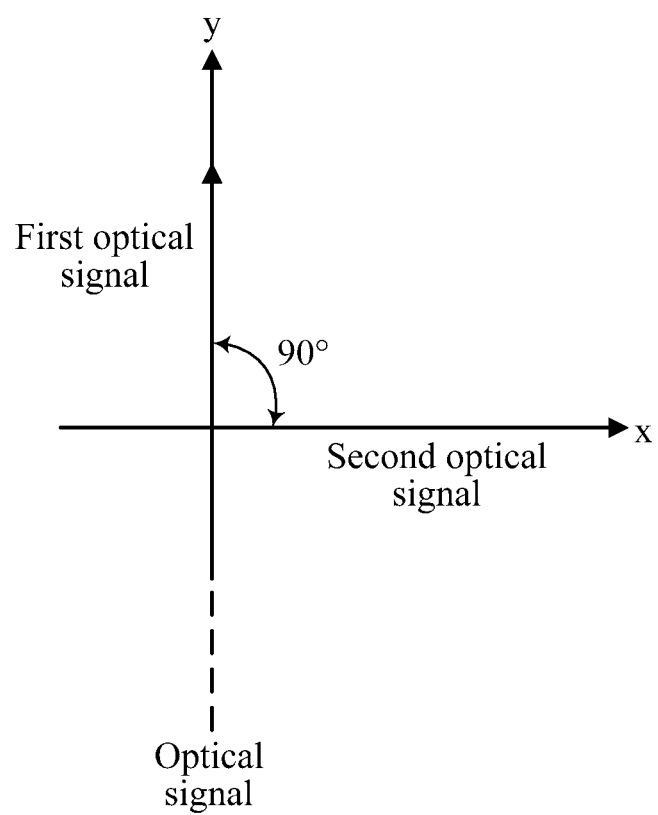
FIG. 7 is still another schematic diagram of an optical signal emitted into a polarization beam splitter.

Referring to FIG. 7, FIG. 7 is another schematic diagram of an optical signal emitted into the polarization beam splitter 402. The y-axis and x-axis represent directions of the first optical signal and the second optical signal that are output by the polarization beam splitter 402, respectively. A dashed line represents a direction of an optical signal that is adjusted by the first adjustment module 401 and enters the polarization beam splitter 402. As shown in FIG. 7, when an angle between the dashed line and the y-axis is 0° (the dashed line overlaps with the y-axis), the dashed line is perpendicular to the x-axis. In this case, the polarization beam splitter 402 may output the first optical signal only in the direction of the y-axis. Further, when an angle between the dashed line and the x-axis is 0°, the dashed line is perpendicular to the y-axis (not shown in FIG. 7). In this case, the polarization beam splitter 402 may output the second optical signal only in the direction of the x-axis.

Further, when only the first optical signal is output in the direction of the y-axis of the polarization beam splitter 402, the first QPSK modulator 403 may use an externally input data stream to modulate the first optical signal, to obtain only one QPSK optical signal. In this case, the polarization beam combiner 406 may output this QPSK optical signal.

Further, when only the second optical signal is output in the direction of the x-axis of the polarization beam splitter 402, the second QPSK modulator 404 may use an externally input data stream to modulate the second optical signal, to obtain only one QPSK optical signal. In this case, the polarization beam combiner 406 may output this QPSK optical signal.

In this embodiment, the first adjustment module 401 may specifically be a Faraday rotator (Faraday Rotator, FR) or a polarization controller, and the second modulation module 405 may specifically be a Faraday rotator or a polarization controller.

In this embodiment, the first adjustment module 401 may obtain two optical signals having a preset power ratio by adjusting an incident angle of an optical signal entering the polarization beam splitter 402; the first QPSK modulator 403 and the second QPSK modulator 404 use an externally input data stream to perform QPSK modulation on the two optical signals respectively, so as to obtain two QPSK signals; according to the optical power ratio between the two QPSK signals, the second adjustment module 405 may adjust the polarization states of the two QPSK signals to be the same, and the polarization beam splitter 406 combines the two QPSK signals to obtain a 16QAM signal; or, the second adjustment module 405 adjusts the polarization states of the two QPSK signals to be orthogonal, and the polarization beam splitter 406 combines the two QPSK signals to obtain a DP-QPSK signal. In this embodiment of the present invention, without changing hardware, an apparatus capable of generating different types of modulation signals is implemented, and is applicable to various transmission scenarios.

Embodiment 2

Figure 8:
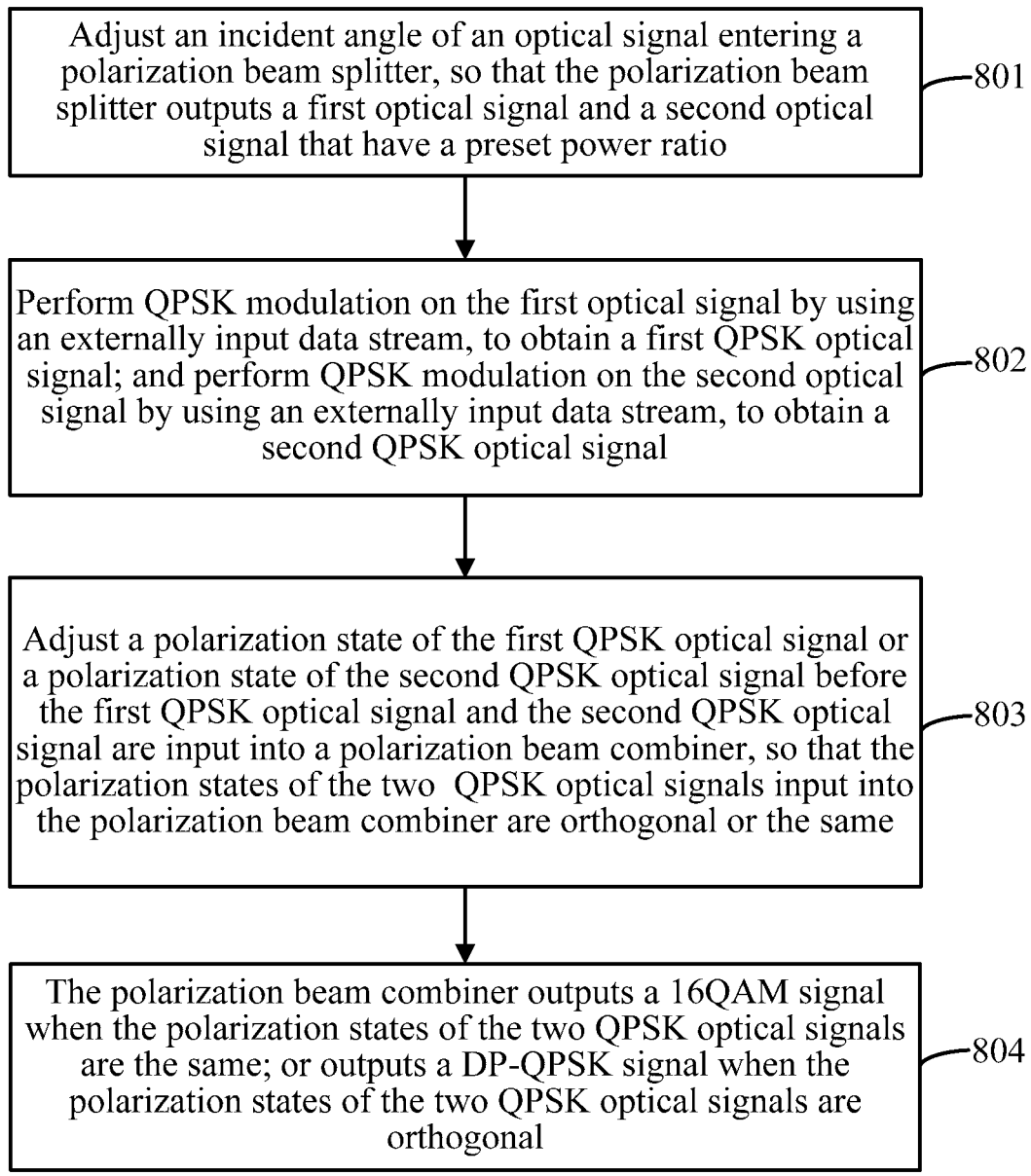
FIG. 8 is a flowchart of a signal generating method according to an embodiment of the present invention.

Referring to FIG. 8, FIG. 8 is a flowchart of a signal generating method according to an embodiment of the present invention. As shown in FIG. 8, the method may include the following steps:

801: Adjust an incident angle of an optical signal entering a polarization beam splitter, so that the polarization beam splitter outputs a first optical signal and a second optical signal that have a preset power ratio.

A Faraday rotator (Faraday Rotator, FR) or a polarization controller may be used to adjust the incident angle of the optical signal entering the polarization beam splitter, so that the polarization beam splitter outputs two optical signals having a preset power ratio. The optical signal may be provided by a laser diode (LD).

For example, the incident angle of the optical signal emitted into the polarization beam splitter may be specifically adjusted, so that a power ratio between the first optical signal and the second optical signal that are output by the polarization beam splitter is 1:4 or 4:1. The specific implementation process of adjusting incident angle of the optical signal emitted into the polarization beam splitter so that the power ratio between the first optical signal and the second optical signal that are output by the polarization beam splitter is 1:4 or 4:1 has been described in detail in Embodiment 1. The details will not be described herein again.

For another example, the incident angle of the optical signal emitted into the polarization beam splitter may be specifically adjusted, so that the power ratio between the first optical signal and the second optical signal that are output by the polarization beam splitter is 1:1. The specific implementation process of adjusting the incident angle of the optical signal emitted into the polarization beam splitter so that the power ratio between the first optical signal and the second optical signal that are output by the polarization beam splitter is 1:1 has been described in detail in Embodiment 1. The details will not be described herein again.

802: Perform QPSK modulation on the first optical signal by using an externally input data stream, to obtain a first QPSK optical signal; and perform QPSK modulation on the second optical signal by using an externally input data stream, to obtain a second QPSK optical signal.

803: Adjust a polarization state of the first QPSK optical signal or a polarization state of the second QPSK optical signal before the first QPSK optical signal and the second QPSK optical signal are input into a polarization beam combiner, so that the polarization states of the two QPSK optical signals that are input into the polarization beam combiner are orthogonal or the same.

In this embodiment, in a situation in which the power ratio between the first optical signal and the second optical signal is 1:4 or 4:1, the FR or the polarization controller may be used to adjust the polarization state of the second QPSK optical signal, so that the polarization states of the first QPSK optical signal and the second QPSK optical signal that are input into the polarization beam combiner are the same, and the polarization beam combiner may output a 16QAM signal.

Optionally, in the situation in which the power ratio between the first optical signal and the second optical signal is 1:4 or 4:1, the FR or the polarization controller may be used to adjust the polarization state of the first QPSK optical signal, so that the polarization states of the first QPSK optical signal and the second QPSK optical signal that are input into the polarization beam combiner are the same, and the polarization beam combiner may output a 16QAM signal.

In this embodiment, in a situation in which the power ratio between the first optical signal and the second optical signal is 1:1, the FR or the polarization controller may be used to adjust the polarization state of the second QPSK optical signal, so that the polarization states of the first QPSK optical signal and the second QPSK optical signal that are input into the polarization beam combiner are orthogonal, and the polarization beam combiner may output a DP-QPSK signal.

Optionally, in the situation in which the power ratio between the first optical signal and the second optical signal is 1:1, the FR or the polarization controller may be used to adjust the polarization state of the first QPSK optical signal, so that the polarization states of the first QPSK optical signal and the second QPSK optical signal that are input into the polarization beam combiner are orthogonal, and the polarization beam combiner may output a DP-QPSK signal.

804: The polarization beam combiner outputs a 16QAM signal when the polarization states of the two QPSK optical signals are the same; or outputs a DP-QPSK signal when the polarization states of the two QPSK optical signals are orthogonal.

Further, in the signal generating method provided by this embodiment, the FR or the polarization controller may also be used to adjust the incident angle of the optical signal emitted into the polarization beam splitter, so that the polarization beam splitter only outputs one optical signal. In this case, the QPSK modulation is performed on the only one optical signal output by the polarization beam splitter by using an externally input data stream, to obtain one QPSK optical signal; and the one QPSK optical signal is output by the polarization beam combiner, to obtain one QPSK optical signal.

In this embodiment, two optical signals having a preset power ratio may be obtained by adjusting an incident angle of an optical signal entering the polarization beam splitter, and QPSK modulation is performed on the two optical signals respectively by using an externally input data stream to obtain two QPSK signals; according to the optical power ratio of the two QPSK signals, the two QPSK signals may be adjusted to have the same polarization state and then combined to obtain a 16QAM signal; or the two QPSK signals may be adjusted to have orthogonal polarization states and then combined to obtain a DP-QPSK signal. In this manner, different signals can be generated.

Persons of ordinary skill in the art should understand that all or a part of the steps of the methods according to the embodiments of the present invention may be implemented by a program instructing relevant hardware. The program may be stored in a computer readable storage medium. When the program is run, the steps of the methods according to the embodiments are performed. The storage medium may be any medium that is capable of storing program codes, such as a read-only memory (ROM), a random access memory (RAM), a magnetic disk, or an optical disk.

The signal generating method and apparatus provided by the embodiments of the present invention are described in detail in the foregoing. The principle and implementation manners of the present invention are described herein by using specific examples. The description about the embodiments of the present invention is merely provided for ease of understanding of the methods and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A signal generating apparatus, comprising a first adjustment module, a polarization beam splitter, a first quadrature phase shift keying modulator, a second quadrature phase shift keying modulator, a second adjustment module, and a polarization beam combiner,
    wherein the first adjustment module is configured to adjust an incident angle of an optical signal entering the polarization beam splitter, so that the polarization beam splitter outputs a first optical signal and a second optical signal that have a preset power ratio;
    wherein the first quadrature phase shift keying modulator is configured to modulate the first optical signal by using an externally input data stream, so as to obtain a first quadrature phase shift keying optical signal;
    wherein the second quadrature phase shift keying modulator is configured to modulate the second optical signal by using an externally input data stream, so as to obtain a second quadrature phase shift keying optical signal;
    wherein the second adjustment module is configured to adjust, before the first quadrature phase shift keying optical signal and the second quadrature phase shift keying optical signal are input into the polarization beam combiner, at least one polarization state selected from the group consisting of:
        a polarization state of the first quadrature phase shift keying optical signal, and
        a polarization state of the second quadrature phase shift keying optical signal;
    and
    wherein the polarization beam combiner is configured to conditionally output:
        a 16 quadrature amplitude modulation signal when the polarization state of the first quadrature phase shift keying optical signal is same as the polarization state of the second quadrature phase shift keying optical signal, and
        a dual polarization quadrature phase shift keying signal when the polarization state of the first quadrature phase shift keying optical signal is orthogonal to the polarization state of the second quadrature phase shift keying optical signal.

2. The apparatus according to claim 1, wherein
    the first adjustment module is configured to adjust the incident angle of the optical signal entering the polarization beam splitter, so that a power ratio between the first optical signal and the second optical signal that are output by the polarization beam splitter is one of the group consisting of: (a) 1:4 and (b) 4:1; and
    the second adjustment module is configured to adjust at least one of the group consisting of the polarization state of the first quadrature phase shift keying optical signal and the polarization state of the second quadrature phase shift keying optical signal, so that the polarization states of the two quadrature phase shift keying optical signals that are input into the polarization beam combiner are the same.

3. The apparatus according to claim 1, wherein
    the first adjustment module is configured to adjust the incident angle of the optical signal entering the polarization beam splitter, so that the power ratio between the first optical signal and the second optical signal that are output by the polarization beam splitter is 1:1; and
    the second adjustment module is configured to adjust at least one of the group consisting of:
        the polarization state of the first quadrature phase shift keying optical signal, and
        the polarization state of the second quadrature phase shift keying optical signal, so that the polarization states of the two quadrature phase shift keying optical signals that are input into the polarization beam combiner are orthogonal.

4. The apparatus according to claim 1, wherein
    the first adjustment module is further configured to adjust the incident angle of the optical signal entering the polarization beam splitter, so that the polarization beam splitter outputs only one optical signal;
    at least one of the group consisting of the first quadrature phase shift keying modulator and the second quadrature phase shift keying modulator, is further configured to use the externally input data stream to modulate the only one optical signal output by the polarization beam splitter, so as to obtain one quadrature phase shift keying optical signal; and
    the polarization beam combiner is further configured to output the quadrature phase shift keying optical signal.

5. The apparatus according to claim 1,
    wherein the first adjustment module is at least one of the group consisting of: a Faraday rotator and a polarization controller, and
    wherein the second modulation module is at least one of the group consisting of: a Faraday rotator and a polarization controller.

6. The apparatus according to claim 2,
    wherein the first adjustment module is at least one of the group consisting of: a Faraday rotator and a polarization controller, and
    wherein the second modulation module is at least one of the group consisting of: a Faraday rotator and a polarization controller.

7. The apparatus according to claim 3,
    wherein the first adjustment module is at least one of the group consisting of: a Faraday rotator and a polarization controller, and
    wherein the second modulation module is at least one of the group consisting of: a Faraday rotator and a polarization controller.

8. The apparatus according to claim 4,
wherein the first adjustment module is at least one of the group consisting of: a Faraday rotator and a polarization controller, and
wherein the second modulation module is at least one of the group consisting of: a Faraday rotator and a polarization controller.

9. An optical signal output generating method, comprising:
adjusting, by first adjustment module under programmed processor control, an incident angle of an optical signal entering a polarization beam splitter, so that the polarization beam splitter outputs a first optical signal and a second optical signal that have a preset power ratio;
performing quadrature phase shift keying modulation on the first optical signal by using a first externally input data stream, to obtain a first quadrature phase shift keying optical signal;
performing quadrature phase shift keying modulation on the second optical signal by using a second externally input data stream, to obtain a second quadrature phase shift keying optical signal;
adjusting, by a second adjustment module under programmed processor control, before the first quadrature phase shift keying optical signal and the second quadrature phase shift keying optical signal are input into a polarization beam combiner, at least one polarization state selected from the group consisting of:
  a polarization state of the first quadrature phase shift keying optical signal, and
  a polarization state of the second quadrature phase shift keying optical signal; and
conditionally outputting, by the polarization beam combiner:
  a 16 quadrature amplitude modulation signal when the polarization state of the first quadrature phase shift keying optical signal is same as the polarization state of the second quadrature phase shift keying optical signal; and
  a dual polarization quadrature phase shift keying signal when the polarization state of the first quadrature phase shift keying optical signal is orthogonal to the polarization state of the second quadrature phase shift keying optical signal.

10. The method according to claim 9, wherein the adjusting the incident angle of the optical signal entering the polarization beam splitter, comprises:
adjusting the incident angle of the optical signal entering the polarization beam splitter, so that a power ratio between the first optical signal and the second optical signal that are output by the polarization beam splitter is one of the group consisting of: (a) 1:4 and (b) 4:1; and
wherein the adjusting at least one of the group consisting of the polarization state of the first quadrature phase shift keying optical signal and the polarization state of the second quadrature phase shift keying optical signal comprises:
adjusting at least one of the group consisting of the polarization state of the first quadrature phase shift keying optical signal and the polarization state of the second quadrature phase shift keying optical signal, so that the polarization states of the two quadrature phase shift keying optical signals input into the polarization beam combiner are the same.

11. The method according to claim 9, wherein the adjusting the incident angle of the optical signal entering the polarization beam splitter, comprises:
adjusting the incident angle of the optical signal entering the polarization beam splitter, so that a power ratio between the first optical signal and the second optical signal that are output by the polarization beam splitter is 1:1; and
wherein the adjusting at least one of the group consisting of the polarization state of the first quadrature phase shift keying optical signal and the polarization state of the second quadrature phase shift keying optical signal comprises:
adjusting at least one of the group consisting of the polarization state of the first quadrature phase shift keying optical signal and the polarization state of the second quadrature phase shift keying optical signal, so that the polarization states of the two quadrature phase shift keying optical signals input into the polarization beam combiner are orthogonal.

12. The method according to claim 9, further comprising:
adjusting the incident angle of the optical signal entering the polarization beam splitter, so that the polarization beam splitter outputs only one optical signal;
using one of the first and second externally input data stream to modulate the only one optical signal output by the polarization beam splitter, so as to obtain one quadrature phase shift keying optical signal; and
outputting, by the polarization beam combiner, the quadrature phase shift keying optical signal.

* * * * *